(12) United States Patent
Korechika

(10) Patent No.: US 7,641,233 B2
(45) Date of Patent: Jan. 5, 2010

(54) OCCUPANT RESTRAINT DEVICE AND OCCUPANT RESTRAINT SYSTEM

(75) Inventor: Koji Korechika, Kanagawa (JP)

(73) Assignee: Autoliv Development AB, Varqarda (SE)

( * ) Notice: Subject to any disclaimer, the term of this patent is extended or adjusted under 35 U.S.C. 154(b) by 423 days.

(21) Appl. No.: 10/588,442

(22) PCT Filed: Feb. 7, 2005

(86) PCT No.: PCT/JP2005/002355

§ 371 (c)(1),
(2), (4) Date: Dec. 5, 2006

(87) PCT Pub. No.: WO2005/075256

PCT Pub. Date: Aug. 18, 2005

(65) Prior Publication Data

US 2007/0126213 A1 Jun. 7, 2007

(30) Foreign Application Priority Data

Feb. 5, 2004 (JP) .............................. 2004-030001

(51) Int. Cl.
*B60R 21/04* (2006.01)
*B60R 21/207* (2006.01)
*B60R 21/18* (2006.01)
(52) U.S. Cl. .................... 280/753; 280/751; 280/730.1; 280/730.2
(58) Field of Classification Search .............. 280/730.1, 280/730.2, 748, 751, 753
See application file for complete search history.

(56) References Cited

U.S. PATENT DOCUMENTS 3,409,326 A * 11/1968 Kerner ...................... 280/753
3,623,768 A * 11/1971 Capener et al. ............. 297/330

(Continued)

FOREIGN PATENT DOCUMENTS

DE 100 38 719 A1 2/2002

(Continued)

OTHER PUBLICATIONS

European Search Report for EP 05 71 0255, EPO, Munich, mailed Feb. 28, 2007.

(Continued)

*Primary Examiner*—Paul N Dickson
*Assistant Examiner*—Drew Brown
(74) *Attorney, Agent, or Firm*—Harness, Dickey & Pierce, P.L.C.

(57) ABSTRACT

An occupant restraint system which is activated instantaneously at an vehicle accident to protect an occupant's body against a disaster. An occupant restraint system (A) is provided on the back (1a) of a seat (1) with a shoulder top restraint device (4) for restraining the right shoulder portion of the occupant (2). The occupant restraint system (A) is provided on the side portion of the back (1a) of the seat (1) with a shoulder side restraint device (5A), which includes: a motor (12) adapted to be actuated by a sense signal of a motor vehicle accident; an instantaneous turning mechanism unit (13) driven by the motor (12); bifurcated arms (14A) mounted on the instantaneous turning mechanism unit (13); and a shoulder receiving portion (15A) mounted on the other ends of the bifurcated arms (14A) for protecting the shoulder side (3b) of the body of the occupant (2).

13 Claims, 9 Drawing Sheets

U.S. PATENT DOCUMENTS

| | | | | |
|---|---|---|---|---|
| 3,713,694 | A | * | 1/1973 | Miller .................. 297/486 |
| 3,901,550 | A | * | 8/1975 | Hamy .................. 297/486 |
| 5,615,909 | A | * | 4/1997 | Wipasuramonton et al. ...... 280/730.2 |
| 6,059,311 | A | * | 5/2000 | Wipasuramonton et al. . 280/729 |
| 6,158,812 | A | * | 12/2000 | Bonke .................. 297/391 |
| 6,237,945 | B1 | * | 5/2001 | Aboud et al. ............ 280/733 |
| 6,382,666 | B1 | * | 5/2002 | Devonport ............... 280/733 |
| 6,425,602 | B1 | * | 7/2002 | Al-Amin et al. .......... 280/730.2 |
| 6,511,093 | B2 | * | 1/2003 | Buerkle et al. ........... 280/729 |

FOREIGN PATENT DOCUMENTS

| | | | |
|---|---|---|---|
| FR | 2 076 427 A | | 10/1971 |
| FR | 2 176 190 A | | 10/1973 |
| GB | 2 386 872 A | | 10/2003 |
| JP | 56 160235 A | | 12/1981 |
| JP | 01-240330 A | | 9/1989 |
| JP | 08-282422 A | | 10/1996 |
| JP | 2001-163159 A | | 6/2001 |
| JP | 2003-261000 A | | 9/2003 |
| JP | 2008195163 A | * | 8/2008 |

OTHER PUBLICATIONS

Anonymous: "Seat mounted shoulder bolster for side impact protection", Research Disclosure, Mason Publications, Hampshire, GB, vol. 458, No. 44, Jun. 2002 XP007130575, ISSN: 0374-4353, the whole document.

* cited by examiner

OCCUPANT RESTRAINT DEVICE AND OCCUPANT RESTRAINT SYSTEM

TECHNICAL FIELD

This invention relates to an occupant restraint device and an occupant restraint system, which can protect an occupant safely at an accident of a vehicle by restraining the back (or shoulder) of an occupant seated on a seat.

BACKGROUND ART

Generally speaking, a vehicle seat is provided with a three-point type seat belt for supporting a body of an occupant at three points so as to ensure safety of the occupant on the seat at a motor vehicle accident. At the accident such as a roll-over (or turnover) or a side collision of the vehicle, it is not rare that the seated occupant receives vertical and transverse shock acceleration so that the head moves to out of position and is damaged by the ceiling, the side window, the door lining panel or the pillars.

At this time, the three-point seat belt restraining the occupant effectively works on posterior or anterior accelerations. Since the three-point seat belt holds the occupant at its three points, it is not effective, as expected, at present against the vertical and transverse accelerations.

In the prior art, as disclosed in Patent Document such as JP-A-2003-261000 (as referred to FIG. 2 and FIG. 7), there has been proposed a technique for developing a side airbag, which is disposed on a side of a vehicle seat, for protecting the seated occupant at the motor vehicle accident such as the roll-over or the side collision.

In the side airbag device of the prior art, as disclosed in the Patent Document, the transverse acceleration can be suppressed at the motor vehicle accident to some extent by the side airbag which is disposed in the space between the occupant and the body side portion of the vehicle. However, there is a problem that only one direction restriction by the side airbag cannot cope with the impact accelerations (or the shocks) in all directions.

In case the sensor is activated by the disturbance in the vehicle position to decide an accident and airbag malfunctions, although not an actual accident such as the roll-over or skid, the expanded airbag cannot be easily restored and is hard to remedy.

There is another defect that it is difficult to store parts needing a relatively large space for storing such as the airbag or the inflator to activate the airbag.

This invention has been conceived in view of the background thus far described, and has an object to provide a occupant restraint device and a occupant restraint system, which can reduce the vertical/transverse impact accelerations, as might otherwise be applied to the back of a occupant, reliably at an accident of the vehicle such as a roll-over or a side collision, thereby to lighten the damage of the occupant, and which can enhance the reusability of the device.

DISCLOSURE OF THE INVENTION

According to the invention of claim 1, there is provided a vehicle occupant restraint device mounted on a back of an occupant's seat, for restraining a shoulder of an occupant thereby to protect a body of the occupant against a motor vehicle accident. The vehicle occupant restraint device is characterized by comprising: a receiving portion for receiving a shoulder side of said occupant softly; an arm portion; and an instantaneous turning mechanism unit for moving said receiving portion, when an impact exceeding a predetermined level is applied to a vehicle, instantaneously from an initial position to a predetermined target position through the arm portion so that the receiving portion may take an arranged state or position for receiving the shoulder side of the occupant.

According to the invention of claim 2, there is provided a vehicle occupant restraint device mounted on a back of an occupant's seat, for restraining a shoulder of an occupant thereby to protect a body of the occupant against a motor vehicle accident. The vehicle occupant restraint device is characterized by comprising: a drive unit for driving in response to a collision sense signal; a rotating shaft adapted to be triggered by driving of the drive unit for instantaneously moving from an initial position to a predetermined target position; an arm portion mounted on the rotating shaft; and a receiving portion mounted on the other end of the arm portion for receiving a shoulder side of the occupant softly.

According to the invention of claim 3, the vehicle occupant restraint device as set forth in claim 2 is characterized in that the rotating shaft includes a flat shaft; a spline shaft and a torsion spring for applying rotation of the flat shaft and the spline shaft; a cam rotor for locking the applying force of the torsion spring usually engages with the flat shaft and the spline shaft; a gear lock for transmitting the rotation of the drive unit engages with the cam rotor on a side of the flat shaft; and a lock plate for locking the shoulder receiving portion at a predetermined position engages with the cam rotor on a side of the spline shaft.

According to the invention of claim 4, the vehicle occupant restraint device as set forth in claim 3 is characterized in that a lock state between the cam rotor and the gear lock on the side of the flat shaft and/or a lock state between the cam rotor and the lock plate on the side of the spline shaft can be easily released.

According to the invention of claim 5, the vehicle occupant restraint device as set forth in claim 2, 3 or 4 is characterized in that the drive unit is made of a motor or an electromagnetic actuator.

According to the invention of claim 6, the vehicle occupant restraint device as set forth in claim 2, 3, 4 or 5 is characterized in that the rotating shaft is disposed at or near an upper side end portion of the back of the seat, and the arm portion with curved shape is supported with the rotating shaft having rotate capability.

According to the invention of claim 7, the vehicle occupant restraint device as set forth in claim 2, 3, 4, 5 or 6 is characterized in that the shoulder receiving portion includes a support pad for receiving the shoulder side of the occupant softly and a support plate for supporting the support pad; and said support pad is made of an elastic member.

According to the invention of claim 8, the vehicle occupant restraint device as set forth in claim 2, 3, 4, 5 or 6 is characterized in that the shoulder receiving portion includes a support pad for receiving the shoulder side of the occupant softly and a support plate for supporting the support pad; and the support pad includes a small airbag.

According to the invention of claim 9, the vehicle occupant restraint device as set forth in claim 8 is characterized by comprising an air pump or an inflator unit as a supply source for supplying gas to the airbag.

According to the invention of claim 10, the vehicle occupant restraint device as set forth in claim 9 is characterized in that the rotating shaft and the arm portion are provided with gas supply passages for supplying the gas from the air pump or the inflator unit to the airbag.

According to the invention of claim 11, the vehicle occupant restraint device as set forth in claim 10 is characterized in that the spline shaft and/or the flat shaft are provided with a notch as a portion of the gas supply passages at a circumferential surface of the spline shaft and/or the flat shaft.

According to the invention of claim 12, the vehicle occupant restraint device as set forth in claim 10 is characterized in that the arm portion is provided with an L-shaped gas passage as a portion of the gas supply passages at a root portion of the arm portion.

According to the invention of claim 13, the vehicle occupant restraint device as set forth in any of claims 1 to 12 is characterized in that the shoulder receiving portion and/or the rotating shaft are returned to the initial positions so that they can be reused after an action of the vehicle occupant restraint device.

According to the invention of claim 14, the occupant restraint system has a shoulder top restraint device for restraining a shoulder top of an occupant is mounted on one side of the back of an occupant's seat, and an occupant restraint device as set forth in any of claims 1 to 13 is mounted on the other side of the back.

According to the constitution of the invention, at the motor vehicle accident such as the roll-over or the side collision, the vertical acceleration and the transverse acceleration on the occupant are suppressed, and the injury of the occupant is reduced. Specifically, the seated occupant is held in the two directions, that is, the shoulder and the entire back are firmly restrained in the upper direction and in the sideway direction. As a result, the occupant can be prevented from being vertically and transversely moved, so that the occupant can be reliably prevented from being hurt to have the head hit on the ceiling of the body side portion or flown to the adjoining seat.

Moreover, the device is a simplified small apparatus including the drive unit to be driven by the collision sense signal, the rotating shaft, the arm portion and the receiving portion, so that it does not take a wide accommodating space but can be housed in the back of the seat.

The rotating shaft is engaged by the lock plate through the cam rotor so that the receiving portion can be reliably restrained (or locked) at a proper position of the shoulder of the occupant. As a result, the shoulder of the occupant can be softly received to protect the occupant's body against a disaster.

Moreover, the lock means of the receiving portion is exemplified by a gear lock or the lock plate 22, so that the locked state after expanded can be released (or loosened) relatively simply. For example, the gear lock can be easily unlocked after expanded, by the reverse drive of a motor 12 or by raising the pawl of the lock plate. Therefore, it is possible to enhance the reusability of the device drastically. As a result, the device can be used many times, when tested for durability or safety, so that its performance test can be drastically enhanced in reliability. Because of this high reusability, the burden on the cost can be kept little even if the using frequency increases, by setting the acceleration threshold of the collision sensing sensor is set relatively low. On the contrary, the device can make high contribution to the prevention of an accident thereby to retain the safety of the occupant more reliable.

Moreover, the drive unit is composed of the motor or the electromagnetic actuator so that it can be electrically quickly and precisely activated with the sense signal at the motor vehicle accident.

In addition, the rotating shaft is disposed at the upper end portion or near the back of the seat, and the curved arm portion is rotatably supported by the rotating shaft. As a result, the receiving portion for receiving the shoulder of the occupant softly can be so compactly stored in the narrow width of the back side as to raise no obstruction.

At the time of the vehicle accident such as the roll-over or side collision, at least the shoulder of the occupant is elastically held by the elastic member so that the damage on the occupant can be made less. The material for the elastic member is desired to have such an elasticity, e.g., a rubbery material or a spongy resin as can be deformed by the ordinary manpower.

At the time of a motor vehicle accident such as the roll-over or the side collision, on the other hand, at least the shoulder of the occupant is elastically firmly held by the airbag so that the damage on the occupant can be reduced. It is arbitrary to provide a device for restraining the shoulder completely from the above.

BRIEF DESCRIPTION OF THE DRAWINGS

Next.

MOST PREFERABLE EMBODIMENT FOR CARRYING OUT THE INVENTION

Figure 1:
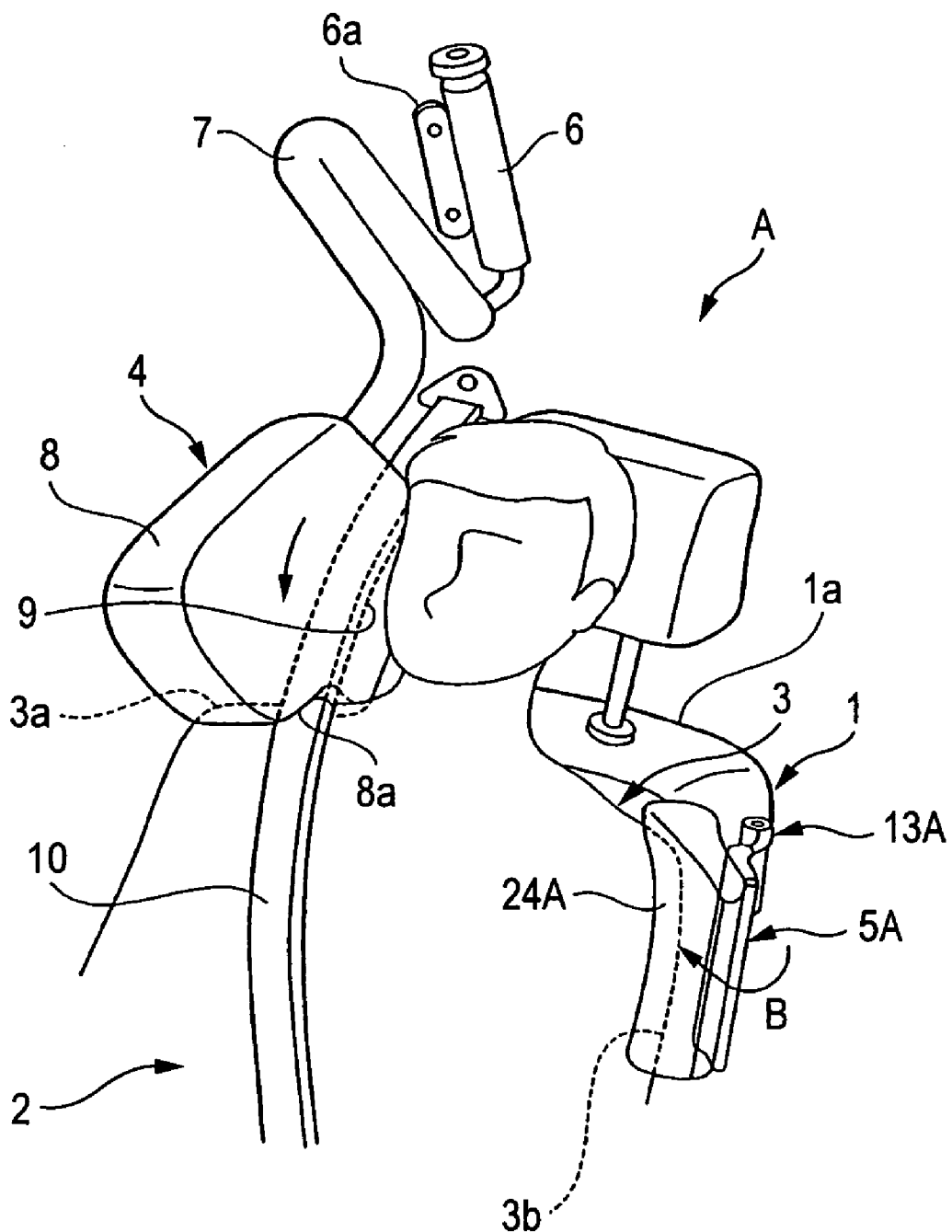
FIG. 1 is a schematic view showing a constitution of a occupant restraint system according to a first embodiment of the invention, and a perspective view showing the schematic constitutions of a shoulder top restraint device constituting the occupant restraint system and the shoulder side restraint device as the occupant restraint system.

The most preferable embodiment for carrying out this invention comprises: a shoulder receiving portion 15 mounted on a back portion 1a of a seat 1, on which an occupant 2 is seated, for receiving softly the shoulder side portion 3b of the occupant 2; bifurcated arms 14A; and a motor (or drive unit) 2 for changing the arranged state or position of the shoulder receiving portion 15 through the bifurcated arms 14A. When an impact exceeding a predetermined level is applied to the vehicle, the shoulder receiving portion 15 is so driven through the bifurcated arms 14A that it is moved from the initial position to a predetermined target position thereby to take an arranged state or position to receive the shoulder side 3b of the occupant 2.

First Embodiment

A first embodiment of the invention is described in the following with reference to the accompanying drawings.

At first, the device is described on its entire constitution.

FIG. 1 is a schematic perspective view schematically showing the constitution of an occupant restraint system according to a first embodiment of the invention. This occupant restraint system A is schematically constituted, as shown in FIG. 1, to comprise: a shoulder top restraint device 4 for receiving, at an emergency such as a roll-over (or turnover) of a vehicle, the shoulder top 3a softly to protect the body of the occupant 2 so that the occupant 2 may not be vertically thrown out of the seat 1; and a shoulder side restraint device 5A for receiving, at an emergency such as a side collision, the shoulder side 3b of the occupant 2 softly to protect the body of the occupant 2 so that the occupant 2 may not be transversely thrown out of the seat 1. FIG. 1 shows an example, in which the shoulder top restraint device 4 is disposed at the righthand portion of the occupant 2 seated on the seat 1, i.e., on the righthand top of the back portion 1a, and in which the shoulder side restraint device 5A is disposed at the lefthand side portion, i.e., on the lefthand top of the back portion 1a. Of course, FIG. 1 presents only one example, and the shoulder top restraint device 4 may be arranged on the lefthand side of the back portion 1a, and the shoulder side restraint device 5A may be arranged on the righthand side of the back portion 1a.

The individual portions of the devices are described in the following.

The description is started from the constitution of the shoulder side restraint device 5A.

Figure 3:
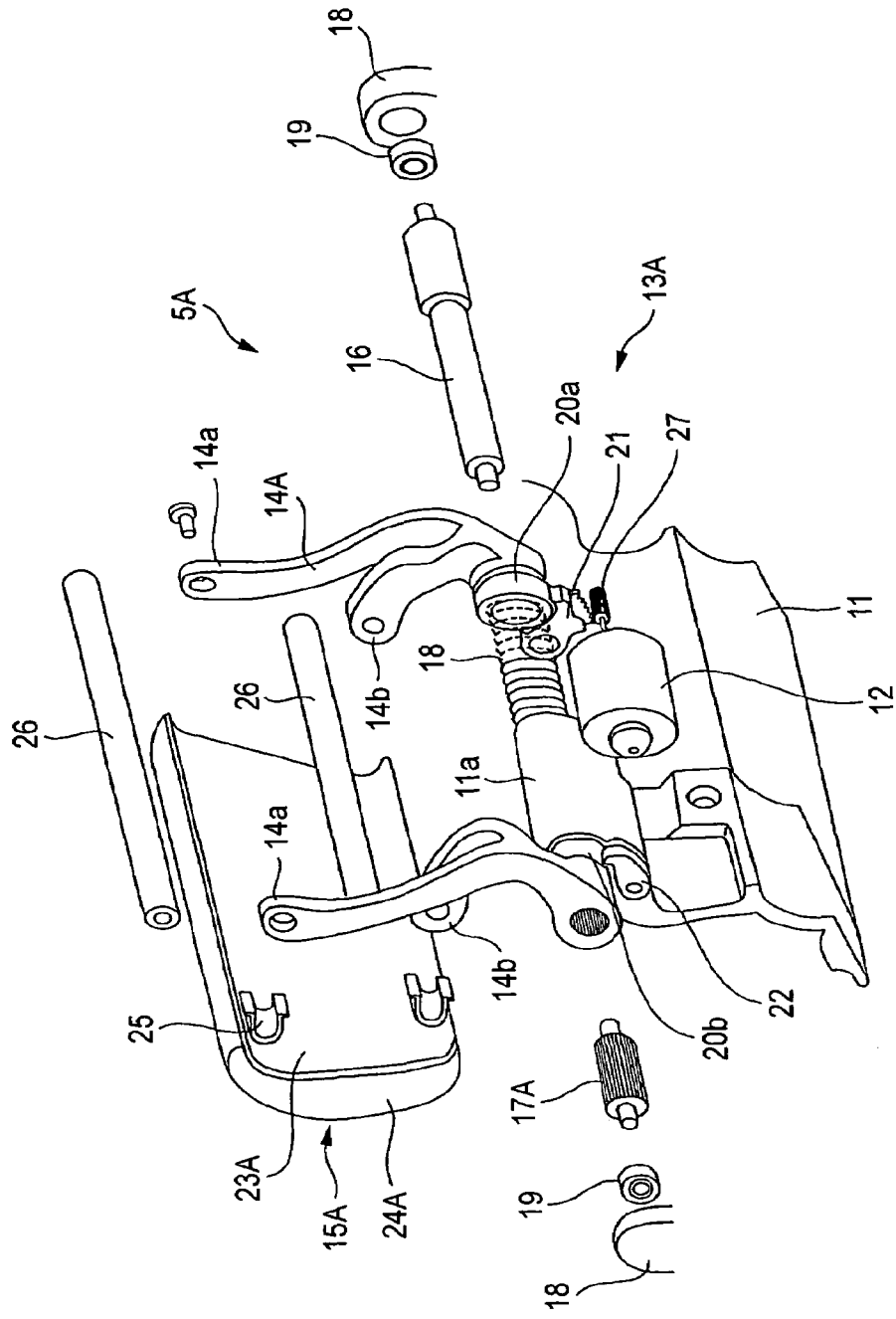
FIG. 3 is an exploded perspective view showing the individual components of the shoulder side restraint device as a occupant restraint device of the occupant restraint system.

The shoulder side restraint device 5A is constituted, as shown in FIG. 3, to include: a support frame 11 mounted and fixed on the not-shown frame disposed on the upper side end portion 1c (FIG. 5) of the back portion 1a of the seat 1, for supporting the individual portions of that device; a shoulder receiving portion 15A for receiving the shoulder side 3b of the body of the occupant 2 softly; an instantaneous turning mechanism unit 13A for turning, at an emergency of the vehicle, the shoulder receiving portion 15A instantaneously toward the shoulder side 3b of the occupant 2; and a pair of bifurcated arms 14A for connecting the instantaneous turning mechanism unit 13A and the shoulder receiving portion 15A. Moreover, the shoulder side restraint device 5A is connected with a not-shown collision sensor such as a vehicle side collision sensor, so that it may be activated in response to the sense signal from the sensor.

The instantaneous turning mechanism unit 13A is constituted, as shown in FIG. 3, to include: a flat shaft 16 and a spline shaft 17A forming on a common axis a rotating main spindle (or a rotating shaft); a torsion springs 18 wound on the flat shaft 16; a cam rotor 20a forming the righthand end portion of the rotating main spindle, engaging with the flat shaft 16 and having lock grooves V1 and V2 (FIG. 4); a cam rotor 20b forming the lefthand end portion of the rotating main spindle, engaging with the spline shaft 17A and having the not-shown lock grooves; a pair of bearings 19 for supporting the rotating main spindle 16 and 17A rotatably in the boss portion 18 of the support frame 11; the driving motor (or a drive unit) 12; a pinion gear 27 mounted on the spindle of the motor 12; a gear lock 21 having a lock blade M for engaging with the lock groove V1 or V2 of the cam rotor 20a to lock the cam rotor 20a, and meshing with the pinion gear 27 for receiving the power of the motor 12 thereby to release the cam rotor 20a from the locked state; and a pawled lock plate 22 for engaging with the not-shown lock groove of the cam rotor 20b thereby to lock the shoulder receiving portion 15A at a predetermined position.

Here, the torsion spring 18 engages at its one end in a twisted mode with the cam rotor 20a on the side of the flat shaft 16, and engages at its other end with a fixing frame 11a. As a result, the spring force acts on the side of the flat shaft 16, but cam rotor 20a is locked by the gear lock 21, so that the torsion spring 18 continues its state for storing the elastic energy. At the emergency of the vehicle, the device is activated to consume the elastic energy, which has been stored until that time.

The paired bifurcated arms 14A and 14A are fixed at their root portions to the two ends of the rotating main spindle 16 and 17A constituting the instantaneous turning mechanism unit 13A so that the bifurcated arms 14A and 14A can turn as the rotating main spindle 16 and 17A turns. The bifurcated arms 14A and 14A are provided with a pair of longer and shorter arm portions 14a and 14b branched midway of the root portions from each other and spaced at a predetermined distance from each other. Moreover, the shoulder receiving portion 15A is mounted to the leading end portions of the paired longer and shorter arm portions 14a and 14b.

The shoulder receiving portion 15A includes a shoulder side protecting pad (or a support pad) 24A acting as the portion for actually receiving, at the emergency of the vehicle, the shoulder side portion 3b of the body of the occupant 2, and a support plate 23A for supporting the shoulder side protecting pad 24A. Moreover, the shoulder receiving portion 15A is mounted and fixed on the bifurcated arms 14A and 14A such that a pair of crossbars 26 and 26 crossing the paired bifurcated arms 14A and 14A are fitted in a pair of U-shaped receivers 25 and 25 disposed on the back of the support plate 23A. The shoulder side protecting pads 24A may be made of a soft and elastic material such as rubber, resin or cloth, or their mixtures.

Figure 4:
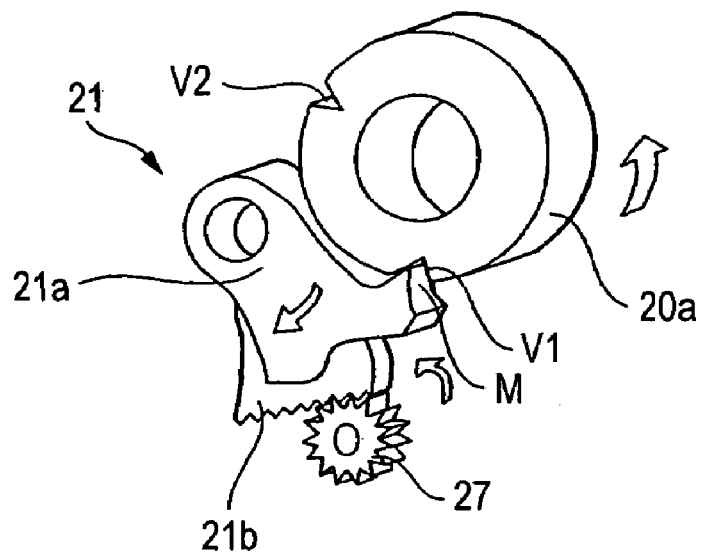
FIG. 4 presents perspective views showing the constitution of a gear lock unit of an instantaneous turning mechanism unit constituting the shoulder side restraint device.
Figure 4:
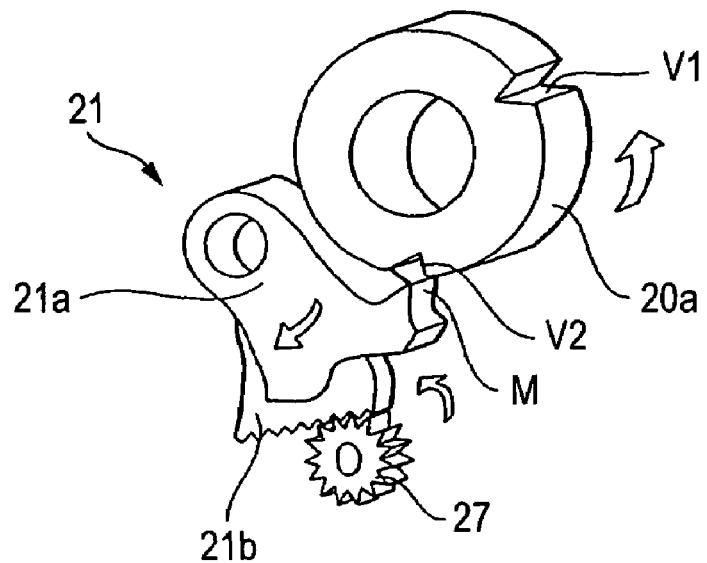

FIG. 4 presents perspective views showing the constitution of the gear lock unit of the instantaneous turning mechanism unit 13A. The gear lock 21 is constituted to include a lock plate 21a which lock cam rotor 20a having a lock blade M engaging with the lock groove V1 or V2 of the cam rotor 20a, and a gear 21b meshing with the pinion gear 27 of the motor 12 to follow the pinion gear 27. As shown in FIG. 4(a), the lock groove V1 of the cam rotor 20a is formed in a circumferential portion corresponding to such a storage position that the shoulder receiving portion 15A (or the shoulder side protecting pad 24A) may be locked at the storage position. As shown in FIG. 4(b), on the other hand, the lock groove V2 is formed in a circumference portion corresponding to such an expanded position that the shoulder receiving portion 15A (or the shoulder side protecting pad 24A) may be locked at the expanded position (or the target position). At the emergency of the vehicle, the drive of the motor 12 triggers the release of the cam rotor 20a from the lock blade M of the lock plate 21a. Then, the cam rotor 20a is instantaneously urged by the spring force of the torsion spring 18 to transmit the rotating force in the order of the cam rotor 20a on the side of the flat shaft 16→the flat shaft 16 and the spline shaft 17A→the bifurcated arm 14A. As a result, the shoulder receiving portion 15A (or the shoulder side protecting pad 24A) pops toward the shoulder side 3b of the occupant.

Next, the constitution of the shoulder top restraint device 4 is described in the following.

The shoulder top restraint device 4 is constituted, as shown in FIG. 1, to include: an inflator 6 for generating and injecting a high-pressure gas instantaneously; an air tube bag 7 communicating at its one end with the inflator 6 for functioning as a tube-shaped airbag; and a shoulder top protecting airbag 8 of an airbag connected to the other end of the air tube bag 7 for communicating with the inflator 6. This inflator 6 is mounted and fixed on the not-shown pillar portion of the vehicle through a mounting tool 6a such as a flange, and is housed together with the folded air tube bag 7 and the shoulder top protecting airbag 8 in the not-shown sash guide portion of a shoulder belt 10. Thus, the shoulder top restraint device 4 is constituted to act in response to the sense signal from the not-shown collision sensing sensor.

The shoulder top protecting airbag 8 is provided with a step portion 8a. This step portion 8a is so formed that it is positioned in the lower portion of the leading end of the expanding direction when the shoulder top protecting airbag 8 protrudes and expands at the emergency of the vehicle from the inside of the sash guide portion. In the face intersecting the expanding direction of that step portion 8a, there is formed a belt tunnel passage 9, which allows the smooth passage of the shoulder belt 10 constituting the three-point seat belt together with the not-shown wrap belt.

Figure 2:
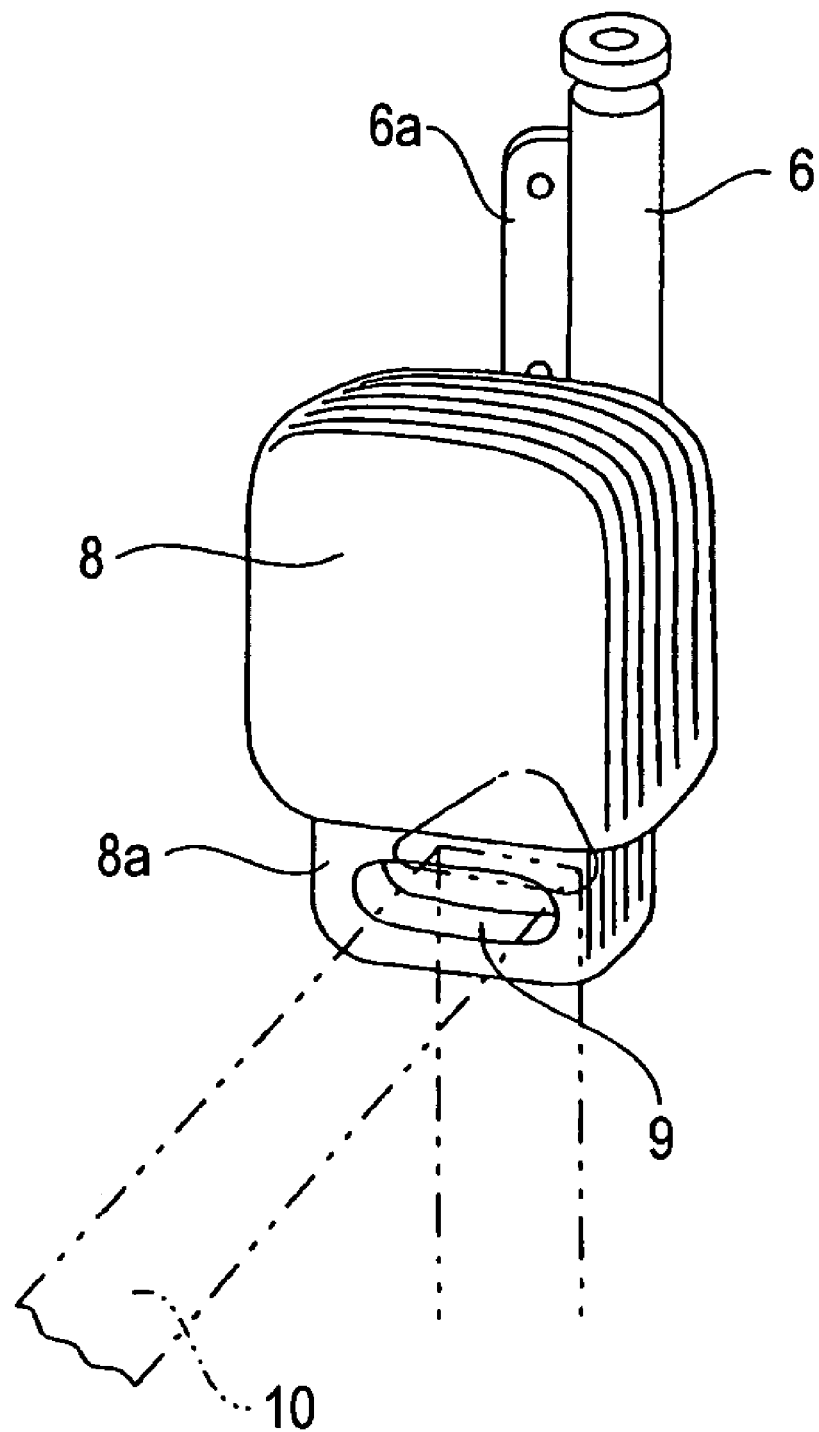
FIG. 2 is a perspective view showing the state, in which a shoulder top airbag used in the shoulder top restraint device of the occupant restraint system is folded and accommodated.

FIG. 2 shows the state, in which both the air tube bag 7 and the shoulder top protecting airbag 8 are folded. The shoulder top restraint device 4 is usually housed in a compactly folded state, as shown in FIG. 2, in the not-shown sash guide portion of the shoulder belt 10. Moreover, the shoulder belt 10 extends through the belt tunnel passage 9 formed in the shoulder top protecting airbag 8, as described above. Therefore, the occupant 2 does not obstruct the operability of the three-point seat belt when the occupant 2 puts on it. When the occupant 2 wears the three-point seat belt, moreover, this seat belt does not obstruct the operability of the shoulder top restraint device 4 at the emergency of the vehicle.

Next, the actions of the occupant restraint system A thus constituted are described in the following.

When the emergency such as a vehicle side collision occurs, the sense signal is created from the not-shown collision sensing sensor (e.g., the vehicle side face collision sensing sensor) and is inputted to the shoulder side restraint device 5A.

In the shoulder side restraint device 5A, the motor 12 is activated in response to the sense signal inputted from the collision sensing sensor. As shown in FIG. 4, the gear lock 21 follows the rotation of the pinion gear 27 of the motor 12 so that the lock blade M comes out of the lock groove V1 of the cam rotor 20a (FIG. 4(a)). As a result, the torsion spring 18 releases the elastic energy. Then, the cam rotor 20a of the flat shaft 16 is urged by the spring force of the torsion spring 18 so that the rotating force is instantaneously transmitted in the order of the cam rotor 20a→the flat shaft 16, the spline shaft 17A→the bifurcated arm 14A. As a result, the shoulder receiving portion 15A (or the shoulder side protecting pad 24A) instantaneously expands (or flies) toward the shoulder side 3b of the occupant (i.e., in the direction of arrow B in FIG. 1 and FIG. 5). When the shoulder receiving portion 15A flies to a predetermined expanding position, the cam rotor 20b on the side of the spline shaft 17A is locked by the pawl of the lock plate 22, and the lock groove V2 of the cam rotor 20a on the side of the flat shaft 16 is also locked by the gear lock 21, as shown in FIG. 4(b). After this, the shoulder receiving portion 15A (or the shoulder side protecting pad 24A) is not pushed back even with a strong reaction.

Therefore, the shoulder side 3b of the occupant 2 is softly received, and the transverse impact acceleration on the body of the occupant 2 is absorbed to prevent the occupant 2 from being transversely thrown away.

On the other hand, the shoulder top restraint device 4 acts simultaneously with the shoulder side restraint device 5A in response to the sense signal inputted. In the shoulder top restraint device 4, the high-pressure gas is fed from the inflator 6 through the air tube bag 7 to the shoulder top protecting airbag 8. As a result, the shoulder top protecting airbag 8 in the folded state is expanded (flies out) and inflated. At this time, the shoulder top protecting airbag 8 is abruptly inflated while being expanded along the shoulder belt by the guide of the belt tunnel passage 9. When the step portion 8a of the shoulder top protecting airbag 8 abuts against the shoulder top 3a of the occupant 2, this shoulder top 3a is restrained by the shoulder top protecting airbag 8 so that the occupant 2 can be prevented from being vertically thrown away against the disaster. When the step portion 8a abuts against the shoulder top 3a of the occupant 2, the shoulder top protecting airbag 8 is prevented from being further moved and expanded along the shoulder belt 10. Even if the inflator 6 generates a predetermined amount of gas continuously, the air tube bag 7, as interposed between the inflator 6 and the shoulder top protecting airbag 8, is folded or buckled to adjust and hold the shoulder top protecting airbag 8 at the preferred position of the head side face (or the shoulder top 3a) of the occupant 2. Thus, the occupant 2 can be prevented (or blocked) from being flown to the ceiling of the car body against the vertical acceleration, which occurs at the roll-over (or turnover) impact time, or from having the head crushed onto the car ceiling.

Thus according to the constitution of this embodiment, the shoulder side 3b of the occupant 2 can be restrained by absorbing the transverse impact acceleration which occurs at the side collision on the side of the driver seat or the navigator seat. At the roll-over (or turnover) time, moreover, the shoulder top 3a of the occupant 2 can be restrained against the vertical impact acceleration to be applied to the back or shoulder of the occupant 2, so that the occupant 2 can be protected against the disaster.

Moreover, the gear lock 21 or the pawled lock plate 22 is used as the lock means for the shoulder receiving portion 15A (or the shoulder side protecting pad 24A), so that the locked state after the expansion can be released (or unlocked) relatively easily. For example, the gear lock 21 can be easily released by the reverse drive of the motor 12, or the pawl may be raised for the pawled lock plate 22. According to the shoulder side restraint device 5A thus constituted, therefore, the device reusability can be drastically enhanced. As a result, the device can be used many times, when tested for durability or safety, so that its performance test can be drastically enhanced in reliability. Because of this high reusability, the burden on the cost can be kept little even if the using frequency increases, by setting the acceleration threshold of the collision sensing sensor is set relatively low. On the contrary, the device can make high contribution to the prevention of an accident thereby to retain the safety of the occupant more reliable.

Second Embodiment

Next, an occupant restraint system C according to a second embodiment of the invention is described in the following.

Figure 5:
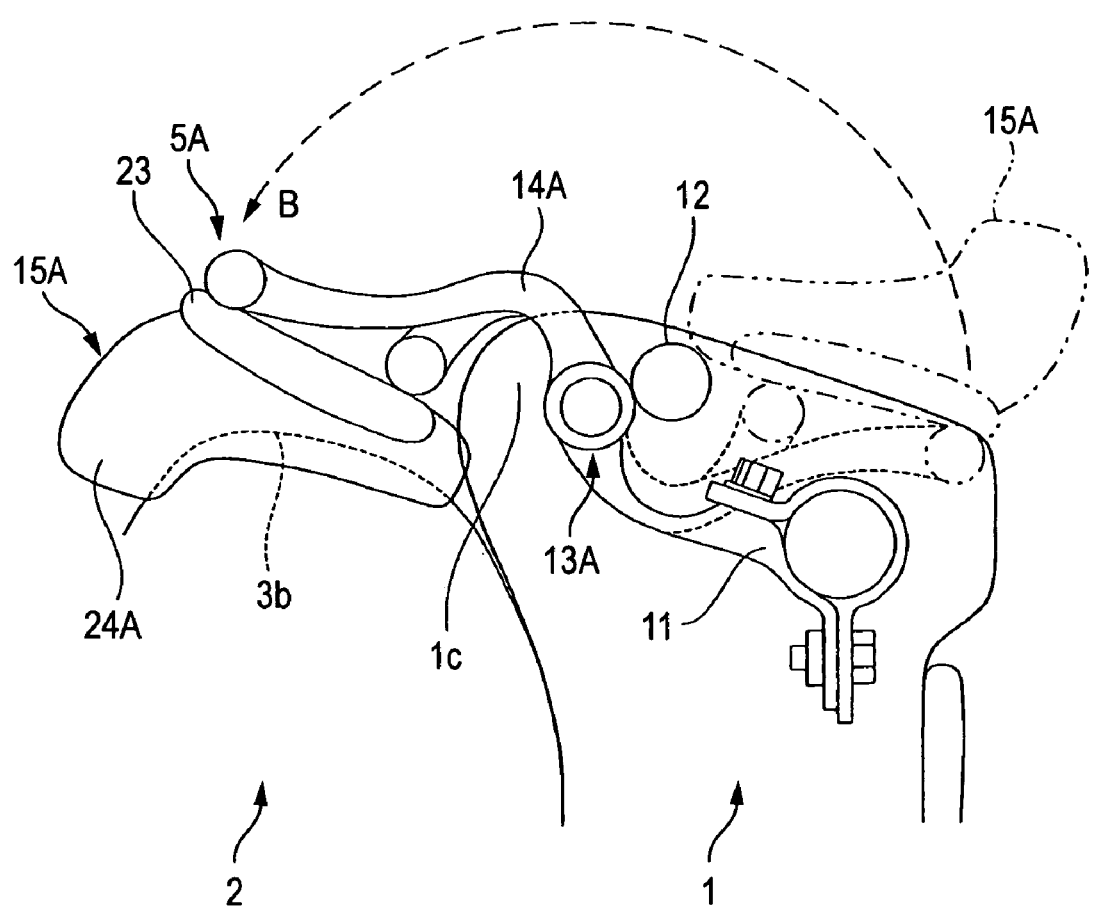
FIG. 5 is a view taken upward and showing the shoulder side restraint device of FIG. 1, and a top plan view for explaining the acting state of the shoulder side restraint device.
Figure 6:
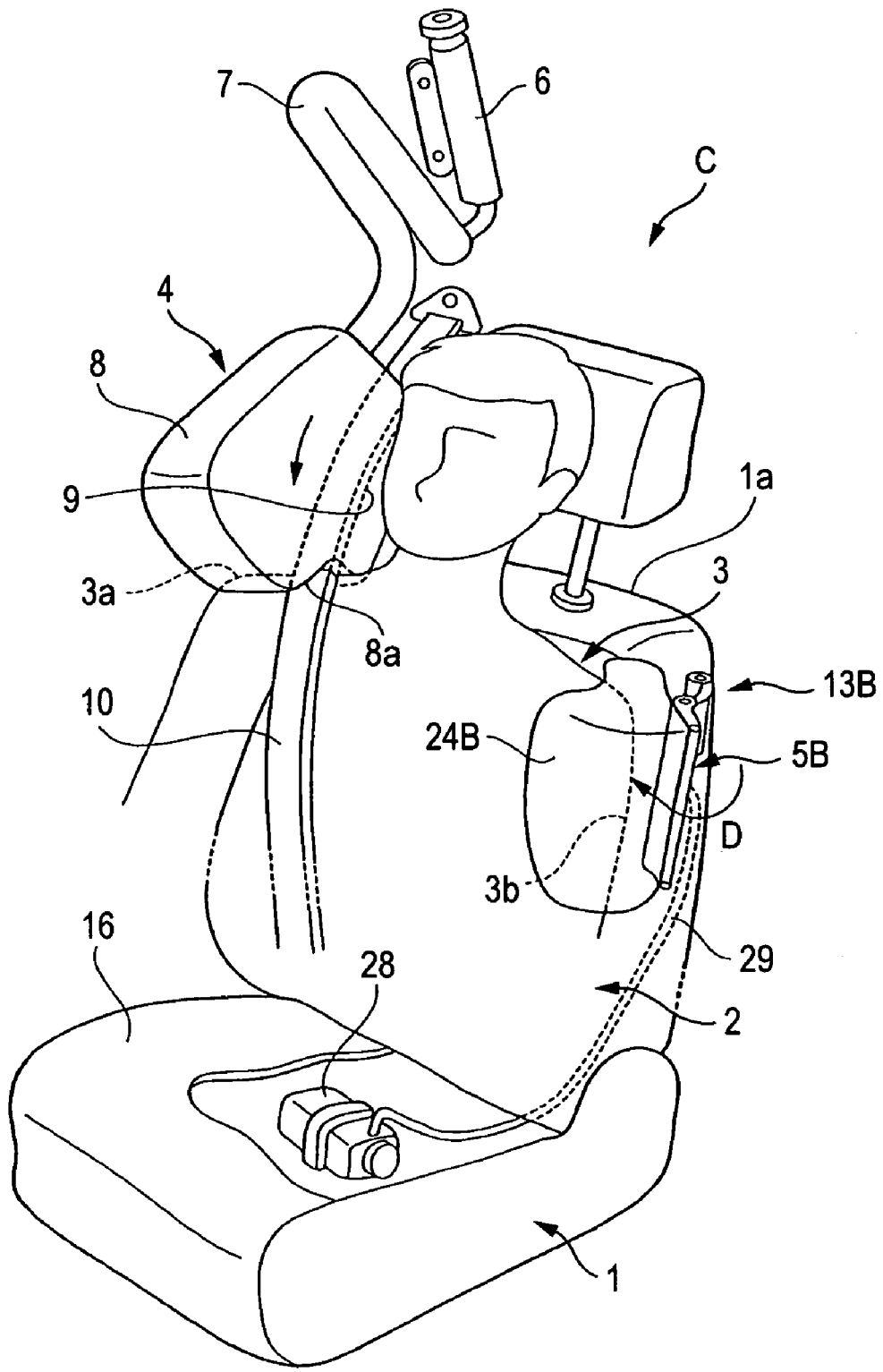
FIG. 6 is a schematic view showing a constitution of a occupant restraint system according to a second embodiment of the invention, and a perspective view showing the schematic constitutions of a shoulder top restraint device constituting the occupant restraint system and the shoulder side restraint device as the occupant restraint system.
Figure 9:
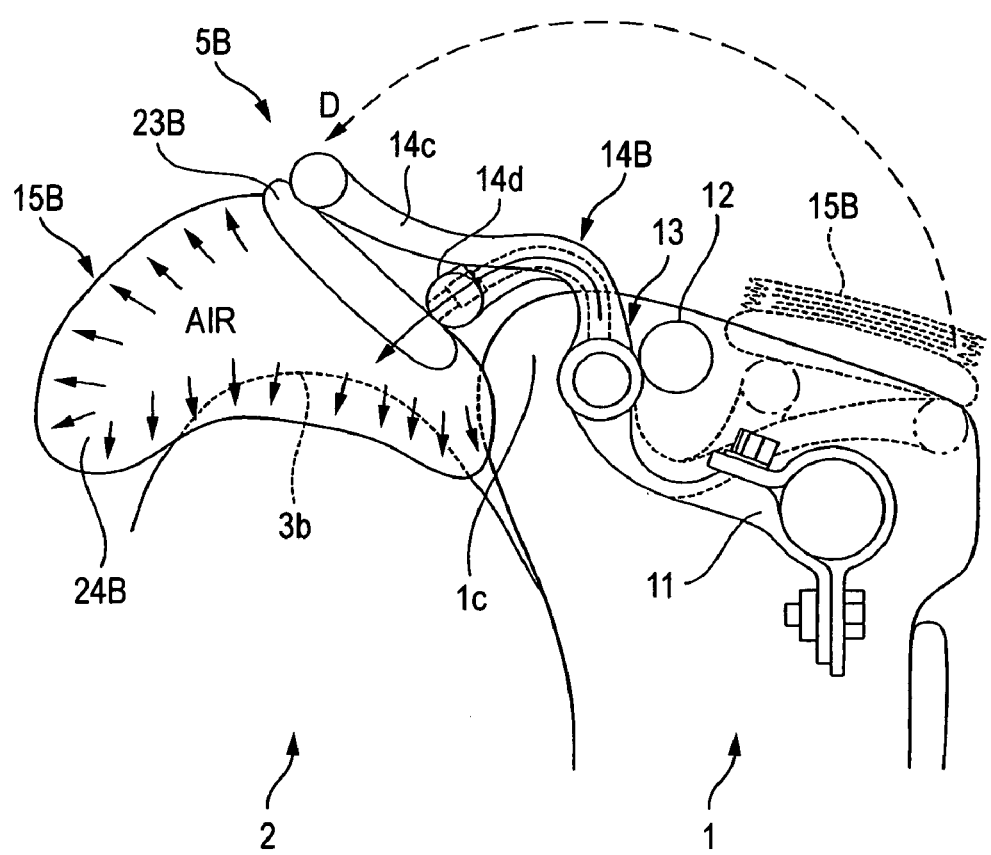
FIG. 9 is a view taken upward and showing the shoulder side restraint device of FIG. 6, and a top plan view for explaining the acting state of the shoulder side restraint device.

What the constitution of this second embodiment is largely different from the aforementioned one of the first embodiment is that not the shoulder side protecting pad 24A made of the rubber member, resin or cloth member but, shown in FIG. 5, a shoulder side protecting airbag 24B of expansion/inflation type (or a small airbag) is used as a shoulder receiving portion 15B of a shoulder side restraint device 5B. The resultant difference is that a passage structure for supplying high-pressure air to the shoulder side protecting airbag 24B. On the remaining points, the second embodiment is similar in constitutions and actions to the first embodiment. In FIG. 6 and FIG. 9, therefore, the same portions of the constitution as those of FIG. 1 and FIG. 5 are omitted on their description by designating them by the common reference numerals. For example, the shoulder top restraint device 4 (FIG. 6) of this embodiment has a constitution identical to that of the shoulder top restraint device 4 (FIG. 1) in the aforementioned first embodiment. Therefore, the following description is restricted to only the constitution and action of the shoulder side restraint device 5B while omitting the constitution and action of the shoulder top restraint device 4.

The shoulder side restraint device 5B of this embodiment is schematically constituted to include: the airbag type shoulder receiving portion 15B adapted to be instantaneously expanded and inflated to receive and constrict the shoulder side 3b of the occupant 2 softly; an instantaneous turning mechanism unit 13B adapted to turn, at an emergency of the vehicle, the shoulder receiving portion 15B instantaneously toward the shoulder side 3b of the occupant 2, and to have an air supply passage; an air pump 28 for sucking air, at the emergency of the vehicle, to supply the sucked air to the shoulder receiving portion 15B thereby to expand and inflate the shoulder side protecting airbag 24B; and an air supplying tube 29 interposed between the air pump 28 and the shoulder side protecting airbag 24B (i.e., the instantaneous turning mechanism unit 13B having the air supply passage).

Figure 7:
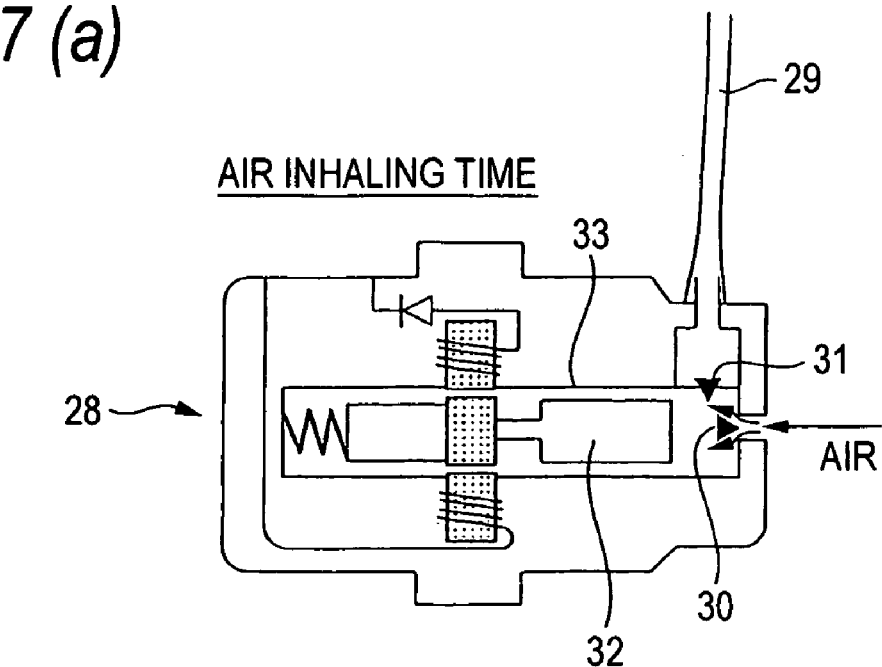
FIG. 7 presents conceptional diagrams showing the action states of an air pump to be used in a shoulder side restraint device as the same occupant restraint device.
Figure 7:
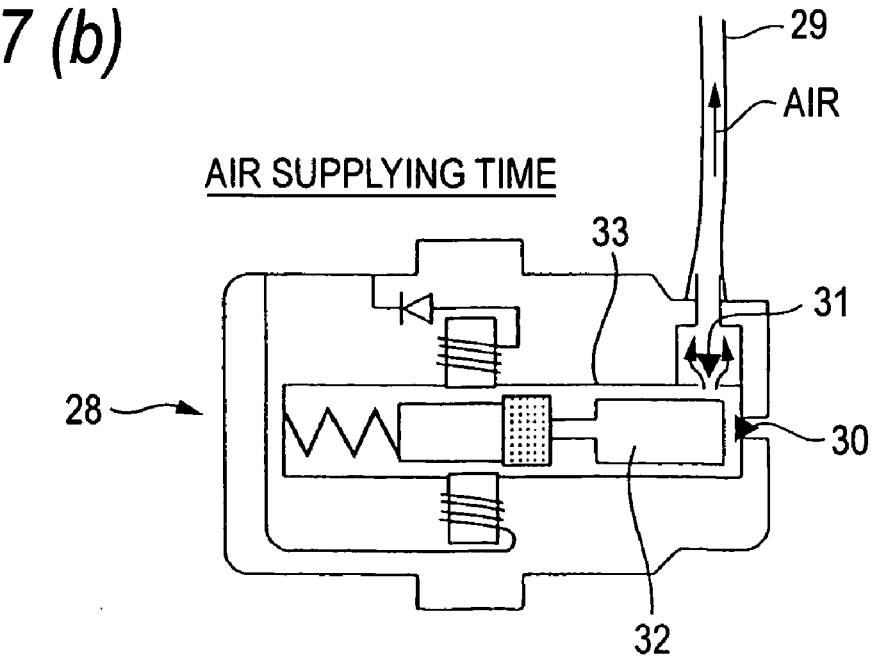

The aforementioned air pump 28 is housed in the base 1b of the seat 1, as shown in FIG. 6, and is constituted, as shown in FIG. 7, to include: an air intake valve 30 for sucking air from the outside; an air supply valve 31 for supplying the air to the shoulder side protecting airbag 24B through an air supply passage such as the air supplying tube 29; and an electromagnetic drive piston 32 and an air cylinder 33. At the air inhaling time for one half of the drive period, as shown in FIG. 7(a), the electromagnetic air cylinder 33 is driven to move the piston 32 leftward of the drawing so that the air intake valve 30 is "opened" whereas the air supply valve 31 is "closed". As a result, the air is taken into the air cylinder 33. During the air supplying time for the second half of the drive period, as shown in FIG. 7(b), the air cylinder 33 is inversely driven to move the piston 32 rightward of the drawing so that the air intake valve 30 is "closed" whereas the air supply valve 31 is "opened". As a result, the high-pressure air is fed through the air supply passage such as the air supplying tube 29 into the shoulder side protecting airbag 24B folded, thereby to inflate the shoulder side protecting airbag 24B.

Figure 8:
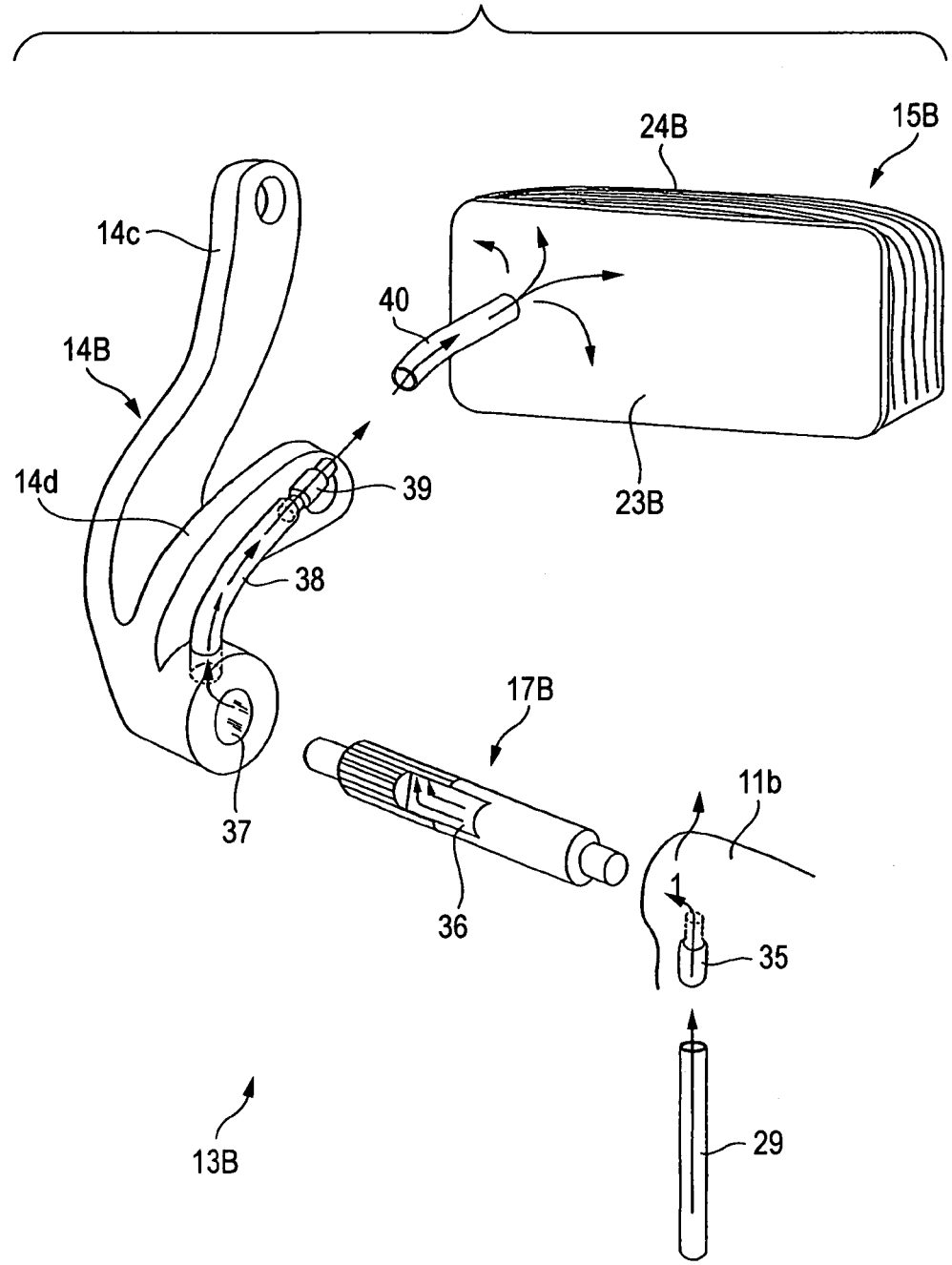
FIG. 8 is an exploded perspective view showing the major portions on an air supply passage in a drive mechanism unit constituting the shoulder side restraint device.

The instantaneous turning mechanism unit 13B of this embodiment is different, as shown in FIG. 8, from the instantaneous turning mechanism unit 13A (FIG. 1) of the foregoing first embodiment, in that air supplying passages 35, 36, 37, 38 and 39 for supplying the high-pressure air from the air pump 28 to the shoulder side protecting airbag 24B are newly added. For the remaining constitutional functions, the instantaneous turning mechanism unit 13B is substantially similar to the instantaneous turning mechanism unit 13A. Excepting the air supplying function, therefore, the description of the common functions is simplified in FIG. 8 by designating the same portions as those of FIG. 3 by the common reference numerals.

The air supply passages through the instantaneous turning mechanism unit 13B are composed, as shown in FIG. 8, to include: an upstream joint portion 35 disposed in a fixing frame 11b for connecting the air supplying tube 29; a spline shaft 17B having a notched portion 36 in its circumference to communicate with the inhaling joint portion 35; an L-shaped pipe 37 formed in the root portion of a bifurcated arm 14B having paired longer and shorter arm portions 14c and 14d and communicating with the notched portion 36; an external supply pipe 38 made of a resin or metal and connected to the L-shaped pipe 37; and a downstream joint portion 39 disposed at the exit of the external supply pipe 38.

The shoulder receiving portion 15B of this embodiment is constituted, as shown in FIG. 8, to include: a bag-shaped shoulder side protecting airbag 24B usually housed in a folded shape and adapted to be expanded and inflated, at the emergency of the vehicle, by the injection of the high-pressure air thereby to receive the body of the occupant 2, i.e., the shoulder side 3b actually; and a support plate 23B for supporting the shoulder side protecting airbag 24B. The support plate 23B is provided, as shown in FIG. 8, with an air intake tube 40 made of a resin or metal and connected to communicate with the exhaust joint portion 39 of the instantaneous turning mechanism unit 13B.

Next, the actions of the shoulder side restraint device 5B thus constituted are described in the following.

When the emergency such as a vehicle side collision occurs, the sense signal is created from the not-shown collision sensing sensor and is inputted to the shoulder side restraint device 5B. In the shoulder side restraint device 5B, the motor 12 and the air pump 28 are activated in response to the sense signal inputted from the collision sensing sensor. In the instantaneous turning mechanism unit 13B, as has been described in connection with the first embodiment, the starting lock is released by the motor drive, and the elastic energy of the torsion spring 18 is released so that the shoulder receiving portion 15B (or the shoulder side protecting airbag 24B) is instantaneously turned and expanded (flies out) toward the occupant shoulder side 3b (in the direction of arrow D in FIG. 6 and FIG. 9). When the shoulder receiving portion 15B flies to a predetermined expanded position, it is finally locked. From now on, the shoulder receiving portion 15B (or the shoulder side protecting airbag 24B) is not pushed back even with a strong reaction.

On the other hand, the air pump 28 starts its pumping action of FIG. 7 when the sense signal is inputted from the collision sensing sensor to the not-shown air pump drive circuit. The air inhaled by the air pump 28 is introduced into the shoulder side protecting airbag 24B via the air supplying tube 29 and the air supply passages 35, 36, 37, 38 and 39 in the instantaneous turning mechanism unit 13B. As a result, the shoulder side protecting airbag 24B inhales the air and expands while being turned and expanded (flying to) toward the occupant shoulder side 3b (in the direction of arrow D in FIG. 6 and FIG. 9) by the instantaneous turning mechanism unit 13B.

The shoulder side protecting airbag 24B thus expanded and inflated receives the shoulder side 3b of the occupant 2 and absorbs the transverse impact acceleration to act on the occupant 2, thereby to prevent the occupant 2 from being transversely thrown away.

According to the constitution of the second embodiment, therefore, the occupant can be saved from the disaster at the collision time of the vehicle. In addition, the second embodiment can enhance the reusability of the device as in the first embodiment.

Although the invention has been described in detail in connection with its embodiments with reference to the accompanying drawings, its specific constitutions should not be limited to those of the embodiments, but the invention covers the change in the design so long as the change does not depart from the gist of the invention.

For example, the foregoing embodiments have been described on the case, in which the back restraint device is directed forward and disposed on the lefthand side portion of the back of the seat. However, the back restraint device may be disposed either on the righthand side portion of the seat back in place of or in addition to the shoulder top restraint device 4, or on the two sides of the back. On the other hand, the shoulder top restraint device may also be disposed on the lefthand top of the back or on the two sides of the back. Here, the drive means may be exemplified not by the motor but by an electromagnetic actuator.

In the aforementioned second embodiment, moreover, the air pump is used, but may be replaced by a replaceable inflator unit. Moreover, the notch as a portion of the gas supply passage should not be limited to the spline shaft but may also be formed either in the flat shaft side or in both the spline shaft and the flat shaft. Here in the aforementioned second embodiment, the air pump 28 is activated simultaneously with the motor 12 thereby to supply the air to the shoulder side protecting airbag 24B. In response to the action of the bifurcated arms 14B, for example, the supply of the air to the shoulder side protecting airbag 24B may also be started.

INDUSTRIAL APPLICABILITY

The foregoing embodiments have been described on the vehicle back restraint device, but this invention can also be utilized in the back restraint device which is attached to the seats of an airplane.

The invention claimed is:

1. A vehicle occupant restraint device mounted on a back of an occupant's seat, for restraining a shoulder of an occupant thereby to protect a body of said occupant against a motor vehicle accident comprising:
 a drive unit for driving in response to a collision sense signal;
 a rotating shaft adapted to be triggered by driving of said drive unit for instantaneously moving from an initial position to a predetermined target position, the rotating shaft including:
  an arm portion mounted thereto, the arm portion having a receiving portion for receiving a shoulder side of said occupant softly;
  a flat shaft;
  a spline shaft and a torsion spring for applying rotation of said flat shaft and said spline shaft;
  a cam rotor for locking the applying force of said torsion spring usually engages with said flat shaft and said spline shaft;
  a gear lock for transmitting the rotation of said drive unit, the gear lock engages with the cam rotor on a side of said flat shaft; and
  a lock plate for locking said shoulder receiving portion at a predetermined position, the lock plate engages with the cam rotor on a side of said spline shaft.

2. A vehicle occupant restraint device as set forth in claim 1, wherein a lock state between said cam rotor and said gear lock on the side of said flat shaft and/or a lock state between said cam rotor and said lock plate on the side of said spline shaft can be easily-released.

3. A vehicle occupant restraint device as set forth in claim 1, wherein said drive unit is selected from one of a motor and an electromagnetic actuator.

4. A vehicle occupant restraint device as set forth in claim 1, wherein said rotating shaft is disposed at or near an upper side end portion of the back of said seat, and said arm portion with curved shape is supported with said rotating shaft having rotate capability.

5. A vehicle occupant restraint device as set forth in claim 1, wherein said shoulder receiving portion includes a support pad for receiving the shoulder side of said occupant softly and a support plate for supporting said support pad; and said support pad is made of an elastic member.

6. A vehicle occupant restraint device as set forth in claim 1, wherein said shoulder receiving portion includes a support pad for receiving the shoulder side of said occupant softly and a support plate for supporting said support pad; and said support pad includes a small airbag.

7. A vehicle occupant restraint device as set forth in claim 6, comprising an air pump or an inflator unit as a supply source for supplying gas to said airbag.

8. A vehicle occupant restraint device as set forth in claim 7, wherein said rotating shaft and said arm portion are provided with gas supply passages for supplying the gas from said air pump or said inflator unit to said airbag.

9. A vehicle occupant restraint device as set forth in claim 1, wherein said shoulder receiving portion and/or said rotating shaft are returned to the initial positions so that they can be reused after an action of said vehicle occupant restraint device.

10. A vehicle occupant restraint device as set forth in claim 1, in combination with an occupant restraint system, the occupant restraint system having a shoulder top restraint device for restraining a shoulder top of the occupant mounted on a first side of the back of the occupant's seat; wherein the occupant restraint device is mounted on a second side of said back.

11. A vehicle occupant restraint device mounted on a back of an occupant's seat, for restraining a shoulder of an occupant thereby to protect a body of the occupant against a motor vehicle accident comprising:
 a drive unit for driving in response to a collision sense signal;
 a rotating shaft adapted to be triggered by driving of the drive unit for instantaneously moving from an initial position to a predetermined target position, the rotating shaft provided with a gas supply passage;
 an arm portion mounted on the rotating shaft, the arm portion provided with a gas supply passage;
 a receiving portion mounted on the other end of the arm portion for receiving a shoulder side of the occupant, the shoulder receiving portion includes a support pad for receiving the shoulder side of the occupant and a support plate for supporting the support pad, and the support pad includes an airbag; and
 a supply source for supplying gas to the airbag.

12. A vehicle occupant restraint device as set forth in claim 11, wherein at least one of said spline shaft or said flat shaft are provided with a notch as a portion of said gas supply passages in a circumference of said at least one spline shaft or said flat shaft.

13. A vehicle occupant restraint device as set forth in claim 11, wherein said arm portion is provided with an L-shaped gas passage as a portion of said gas supply passages at a root portion of said arm portion.

* * * * *